UNITED STATES PATENT OFFICE.

SAMUEL NEWHOUSE, OF DENVER, COLORADO, AND ALFRED JOHN BETTLES AND THOMAS WEIR, OF SALT LAKE CITY, UTAH.

METHOD OR PROCESS OF EXTRACTING PRECIOUS METALS FROM THEIR ORES.

SPECIFICATION forming part of Letters Patent No. 601,201, dated March 22, 1898.

Application filed October 8, 1897. Serial No. 654,578. (No specimens.)

*To all whom it may concern:*

Be it known that we, SAMUEL NEWHOUSE, residing at Denver, in the county of Arapahoe and State of Colorado, and ALFRED JOHN BETTLES and THOMAS WEIR, residing at Salt Lake City, Salt Lake county, Utah, citizens of the United States of America, have invented certain new and useful Improvements in Methods or Processes for the Extraction of Precious Metals from Their Ores; and we do declare the following to be a full, clear, and exact description of the invention, such as will enable others skilled in the art to which it appertains to make and use the same.

Our invention relates to an improved art, method, or process for the extraction of gold or gold and silver from clayey ores or ores too finely pulverized to be successfully leached.

In practicing our improved method or process the ore is first crushed or pulverized sufficiently fine to release the metal or metals to be saved. In any event the ore cannot be too finely comminuted for treatment by our process. If the ore to be treated is neutral—that is, neither acid nor alkaline—or if it is alkaline, it is then put into a rotary vessel or revolving barrel or tub or amalgamating-pan or any other suitable receptacle in which or by which it can be sufficiently agitated with and in a solution consisting of water and cyanid of potassium, as hereinafter described. The quantity of water varies from one-fifth of the weight of the ore to twice the weight of the ore to be treated, the proper proportions being determined by experiment. The amount of cyanid of potassium varies from five-hundredths of one per cent. (.05) to two per cent. (2) of the water employed. This is also determined by experiment. This mixture of water and cyanid of potassium we term the "cyanid solution." Hereinafter we use the term "cyanid" to mean cyanid of potassium. This solution is put into the amalgamating pan or barrel, after which the pulverized ore is added thereto. The ore and solution are then agitated together for a period varying from one-half to sixteen hours, (the actual time being determined by experiment,) after which zinc is added and the agitation continued for a period varying from one to thirty minutes. The amount of zinc employed is usually about sixteen times the amount of gold to be extracted and therefore depends on the gold contents of the ore to be treated. The zinc should be in the form of finely-divided particles. It may consist of zinc-shavings, zinc-filings, or zinc-dust. It is not necessary that the zinc be pure, so long as the adulteration does not interfere with the process. The zinc will not usually precipitate the precious metals if the cyanid solution contains less than one-tenth of one per cent. (0.1) cyanid.

Good results in precipitation of the precious metals with zinc are usually obtained when the cyanid solution contains one-tenth of one per cent. (0.1) cyanid or more. The proper strength of cyanid solution necessary for good precipitation of the precious metals is determined by experiment. Therefore before adding the zinc the cyanid solution should be tested to determine the percentage of cyanid present. If the test shows one-tenth of one per cent. (0.1) cyanid or more present, then add the zinc, as indicated above. In case the test shows less than one-tenth of one per cent. (0.1) cyanid present, then and in that case sufficient cyanid should be added to the solution to make the percentage of cyanid (or strength of the cyanid solution) about one-tenth of one per cent. (0.1) or more, after which the zinc should be added and the whole mass agitated, as above described. After agitating the mass composed of the cyanid solution, ore, and zinc during the necessary period a quantity of quicksilver or mercury equal to about five per cent. (5) of the weight of the ore under treatment is added, after which the whole mixture is agitated for a further period of about an hour. The time, however, varies from fifteen minutes to one hour. Before adding the quicksilver or mercury the latter is charged with sodium amalgam. The amount of the latter used is about one part of sodium amalgam to five thousand parts of quicksilver or mercury. The amalgamation takes place almost immediately. In case the mixture of ore and water gives an acid reaction it may be necessary to neutralize the acidity of the ore before using the cyanid in order to economize the consumption of cyanid. The alkali used may be common lime or any other suitable alkali. In such cases we determine by experiment the amount or per cent. of the alkali which is necessary to neutralize the acidity of the ore. If the weight of cyanid and ore are to be equal, we take a quantity of water equal, by weight, to about three-fourths the weight of the ore to be treated, and add to this water an amount of common lime (or whatever alkali is to be used) slightly more than is sufficient to neutralize the acidity of the ore. The ore is then added to the mixture of water and alkali, after which the mass is agitated about twenty minutes or until the whole is sufficiently stirred to form a homogeneous mass or pulp. The solution is then tested for alkali. It should be slightly alkaline. If it is not, sufficient alkali must be added to give an alkaline reaction. The cyanid solution is then added. If a one-tenth per cent. cyanid solution is to be used, a quantity of water is taken equal to one-fourth the weight of the ore. For instance, if two tons of ore are being treated the quantity of water is one-half a ton. Four pounds of cyanid of potassium are then added to and dissolved in this water. This cyanid solution of four per cent. strength is then added to the above-described mixture of ore and alkaline solution, making a mixture containing two tons of ore and two tons of solution (previously made alkaline) and four pounds of cyanid of potassium, forming a cyanid solution of one-tenth per cent. strength. The exact percentage of water used when neutralizing the acidity of the ore or in preparing the cyanid is not material, providing the final results are substantially as described herein. The above-described mixture of ore and solutions is then agitated for a period varying from one-half to sixteen hours, (the actual time necessary being determined by experiment,) after which the zinc is added and the agitation continued for a period varying from one minute to thirty minutes, (the actual time being determined by experiment.) Before adding the zinc the cyanid solution must be tested to determine the amount of cyanid present, after which proceed as before described. The further treatment of the ore is the same as with neutral ore or ore showing an alkaline reaction and as described above for such ores. If the ore is so clayey or lumpy as to remain lumpy or refuse to be reduced to a fluid mass when agitated with the solutions, the ore should then be dried and subsequently crushed or pulverized sufficiently to reduce the lumps or balls before agitating it in the solution, as above. After drying the ore and subsequently crushing or pulverizing it sufficiently it is tested for acidity and treated either as neutral ore or alkaline ore or ore which gives an acid reaction, as herein described. The agitation of the ore in the cyanid solution puts all the very fine gold into solution. The remaining gold contents are in condition to be amalgamated. The subsequent addition of zinc to the mixture of ore and cyanid solution precipitates the gold held in solution. The gold so precipitated, together with the gold existing as free gold or gold too coarse to be dissolved by the cyanid solution, is amalgamated, when the quicksilver charged with sodium amalgam is added. The resulting amalgam is treated in the usual way to obtain the silver and gold contents.

Nothing is of course claimed, broadly, on the cyanid solution or the method of agitating the ore in solution. We have, however, discovered a new method for precipitating gold and silver, or either of them, from a mixture of ore and cyanid solution without making any separation of ore and solution by filtering or otherwise, together with the subsequent amalgamation of the gold precipitate and free gold which has not been dissolved by the use of quicksilver or mercury charged with sodium amalgam. This method is applicable to ores containing gold or gold and silver in any proportions.

It is immaterial how the ore is agitated, provided the agitation is sufficiently severe. Agitation in amalgamating-pans gives good results.

Having thus described our invention, what we claim is—

1. The herein-described method or process for the extraction of the precious metals from their ores, said method or process consisting first, in placing the pulverized ore in a suitable cyanid solution and subjecting the same to agitation, second, adding a quantity of zinc thereto and subjecting the mass to further agitation, and third, adding a quantity of quicksilver or mercury which has been charged with sodium amalgam, and subjecting the entire mass to further agitation.

2. A method or process for the extraction of the precious metals from their ores, said method or process consisting first, in neutralizing the acidity of the ore where this condition exists, second, in placing the ore in a suitable solution of cyanid of potassium and subjecting the mass to agitation, third, in adding a quantity of zinc to the mixture of ore and cyanid and subjecting the mass to further agitation, and fourth, in adding quicksilver or mercury charged with sodium amalgam, and finally agitating the entire mass for purposes of amalgamation.

In testimony whereof we affix our signatures in presence of two witnesses.

SAMUEL NEWHOUSE.
ALFRED JOHN BETTLES.
THOMAS WEIR.

Witnesses as to signature of Samuel Newhouse:
 JOHN A. CALDWELL,
 WILLIAM WOOD.

Witnesses as to signatures of Alfred John Bettles and Thomas Weir:
 MAURICE M. JOHNSON,
 WILLIAM E. BLOCK.